US008817461B2

(12) United States Patent
Chen

(10) Patent No.: US 8,817,461 B2
(45) Date of Patent: Aug. 26, 2014

(54) FIXING MECHANISM FOR FIXING A DETACHABLE MODULE AND RELATED ELECTRONIC DEVICE

(75) Inventor: Yi-Jen Chen, New Taipei (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 110 days.

(21) Appl. No.: 13/434,817

(22) Filed: Mar. 29, 2012

(65) Prior Publication Data

US 2012/0281351 A1  Nov. 8, 2012

(30) Foreign Application Priority Data

May 6, 2011  (TW) .............................. 100208191 U

(51) Int. Cl.
| | |
|---|---|
| *H05H 5/00* | (2006.01) |
| *H05K 7/00* | (2006.01) |
| *G11B 33/02* | (2006.01) |
| *A47G 1/10* | (2006.01) |
| *E04G 3/00* | (2006.01) |
| *A47B 96/06* | (2006.01) |
| *E05C 5/02* | (2006.01) |
| *G06F 1/18* | (2006.01) |

(52) U.S. Cl.
CPC ...................... *G06F 1/187* (2013.01)
USPC ............ 361/679.37; 361/679.32; 361/679.33; 361/679.34; 361/679.35; 361/679.36; 361/679.39; 361/679.57; 369/75.21; 248/316.5; 248/292.14; 248/229.22; 292/8; 292/4; 292/341.17; 74/142

(58) Field of Classification Search
USPC ............. 361/679.01–679.45, 679.31–679.45, 361/679.55–679.6, 724–747; 439/157, 60, 439/152–153, 327, 328, 331; 369/75.11, 369/75.21, 76, 77.11, 77.21, 78, 79, 80, 81, 369/82; 248/80–88, 155.1–155.5, 166–173, 248/180.1–186.2, 229.1–231.51, 271.4, 248/292.14, 316.1–316.8; 74/141–169, 74/380–387
See application file for complete search history.

(56) References Cited

U.S. PATENT DOCUMENTS

| | | | |
|---|---|---|---|
| 6,535,391 B2 * | 3/2003 | Larsen et al. ................. 361/727 |
| 2007/0153467 A1 * | 7/2007 | Chen et al. .................... 361/685 |
| 2012/0056515 A1 * | 3/2012 | Chen et al. ................. 312/223.2 |

* cited by examiner

*Primary Examiner* — Jerry Wu
(74) *Attorney, Agent, or Firm* — Winston Hsu; Scott Margo

(57) ABSTRACT

A fixing mechanism for fixing a detachable module is disclosed. The fixing mechanism includes a frame for covering the detachable module. The frame includes a frame body and a pivoting portion connected to the frame body. A pivoting hole is formed on the pivoting portion. The fixing mechanism further includes a casing. The casing includes a lateral plate whereon a slot is formed, a shaft portion extended from the lateral plate in a first direction and disposed on a side of the slot, and an engaging portion extended from the lateral plate in a second direction and disposed on another side of the slot for inserting into the pivoting hole of the pivoting portion so that the pivoting portion is capable of pivoting from a first position to a second position as abutting against the shat portion.

15 Claims, 10 Drawing Sheets

FIXING MECHANISM FOR FIXING A DETACHABLE MODULE AND RELATED ELECTRONIC DEVICE

BACKGROUND OF THE INVENTION

1. Field of the Invention

The present invention relates to a fixing mechanism for fixing a detachable module and a related electronic device, and more particularly, to a fixing mechanism by utilizing a rotary assembly for fixing a detachable module and a related electronic device.

2. Description of the Prior Art

People have to take apart computers when replacing broken components or upgrading instruments inside the computer. So computers capable of being disassembled easily are necessary. It is also inconvenient for users to disassemble a storage device such as a hard disk from a computer.

For example, please refer to FIG. 1. FIG. 1 is a diagram of a computer device 10 in the prior art. The computer device 10 includes a housing 11 similar to a rectangular shape, a power supply 12 disposed on a rear-right side inside the housing 11, an optical disk drive fixture 13 disposed on a front-right side inside the housing 11, and a hard disk drive fixture 14 disposed under the optical disk drive fixture 13 inside the housing 11. A plurality of fixing holes 15 is formed on both right and left sides of the hard disk drive fixture 14. A hard disk drive 16 with a plurality of tapped holes 17 formed on both right and left sides can be placed inside the housing from the front, rear, or top sides of the housing 11, and the hard disk drive 16 can be fixed on the hard disk drive fixture 14 by screwing the tapped holes 17 and the fixing holes 15.

Before users disassemble the hard disk drive 16 from the computer device 10, they have to disassemble an optical disk drive first and then loose screws on both the left and right sides of the hard disk drive fixture 14. It is hard to disassemble the hard disk drive 16 due to the limited internal space of the computer device 10. Some hard disks are placed inside the housing 11 from the rear side of the housing 11, so that the power supply 12 has to be disassembled before disassembling the hard drive 16. Disassembling the power supply 12 is even more difficult than disassembling the optical disk drive. No matter where the hard disk drive 16 is placed inside the housing 11, it is difficult to screw the hard disk drive 16 in the limited internal space inside the housing 11.

For solving above drawbacks, there have been various detachable modules in the market. For example, a detachable module for easy disassembly is disclosed in TW Patent No. I259449 for enhancing assembly efficiency of storage devices installed inside the computer device, and for reducing difficulty of replacing the storage devices. However, it is still difficult to assemble the above-mentioned detachable module in limited internal space of the computer, especially for the current trend of a computer device with small size and light weight, so as to increase complexity and inconvenience of the assembly.

SUMMARY OF THE INVENTION

The present invention provides a fixing mechanism by utilizing a rotary assembly for fixing a detachable module and a related electronic device for solving above drawbacks.

According to the claimed invention, a fixing mechanism for fixing a detachable module includes a frame for covering the detachable module. The frame includes a frame body and a pivoting portion connected to the frame body. A pivoting hole is formed on the pivoting portion. The fixing mechanism further includes a casing including a lateral plate whereon a slot is formed, a shaft portion extended from the lateral plate in a first direction and disposed on a side of the slot, and an engaging portion extended from the lateral plate in a second direction and disposed on another side of the slot for inserting into the pivoting hole of the pivoting portion so that the pivoting portion is capable of pivoting from a first position to a second position as abutting against the shaft portion.

According to the claimed invention, the pivoting portion further includes a bending structure formed on a side of the pivoting hole, and the bending structure abuts against the shaft portion as the pivoting portion pivots to the second position.

According to the claimed invention, the pivoting portion further includes a protruding structure formed on a side of the pivoting hole, and the protruding structure prevents rotary interference as the pivoting portion pivots relative to the shaft portion.

According to the claimed invention, the pivoting portion further includes a constraining component formed on a side of the pivoting hole, a positioning hole is formed on the engaging portion, and the constraining component inserts into the positioning hole for preventing the frame from separating from the casing as the pivoting portion rotates to the second position.

According to the claimed invention, the casing further includes a stopper connected to the lateral plate and for stopping the frame body as the pivoting portion rotates to the second position.

According to the claimed invention, the first direction is substantially perpendicular to the second direction.

According to the claimed invention, the first direction is substantially perpendicular to the lateral plate, and the second direction is substantially parallel to the lateral plate.

According to the claimed invention, the frame body of the frame is substantially parallel to the lateral plate of the casing as the pivoting portion is located at the first position, and the frame body of the frame is substantially perpendicular to the lateral plate of the casing as the pivoting portion is located at the second position.

According to the claimed invention, an electronic device includes a detachable module and a fixing mechanism for fixing the detachable module. The fixing mechanism includes a frame for covering the detachable module. The frame includes a frame body and a pivoting portion connected to the frame body. A pivoting hole is formed on the pivoting portion. The fixing mechanism further includes a casing including a lateral plate whereon a slot is formed, a shaft portion extended from the lateral plate in a first direction and disposed on a side of the slot, and an engaging portion extended from the lateral plate in a second direction and disposed on another side of the slot for inserting into the pivoting hole of the pivoting portion so that the pivoting portion is capable of pivoting from a first position to a second position as abutting against the shaft portion.

According to the claimed invention, the detachable module is a hard disk drive or an optical disk drive.

In summary, the present invention provides a fixing mechanism by utilizing a rotary assembly for fixing a detachable module and a related electronic device for improving assembly and disassembly of the detachable module installed inside a computer device. Since the present invention utilizes the frame for covering the detachable module as well as cooperating with the casing so as to rapidly assemble and disassemble the detachable module by rotating, no additional components for assembly is needed, cost decreases effectively, and complexity of assembly and labor hours are greatly reduced. As a result, convenience of assembly and disassembly of the detachable module is effectively enhanced.

These and other objectives of the present invention will no doubt become obvious to those of ordinary skill in the art after reading the following detailed description of the embodiment that is illustrated in the various figures and drawings.

DETAILED DESCRIPTION

Figure 1:
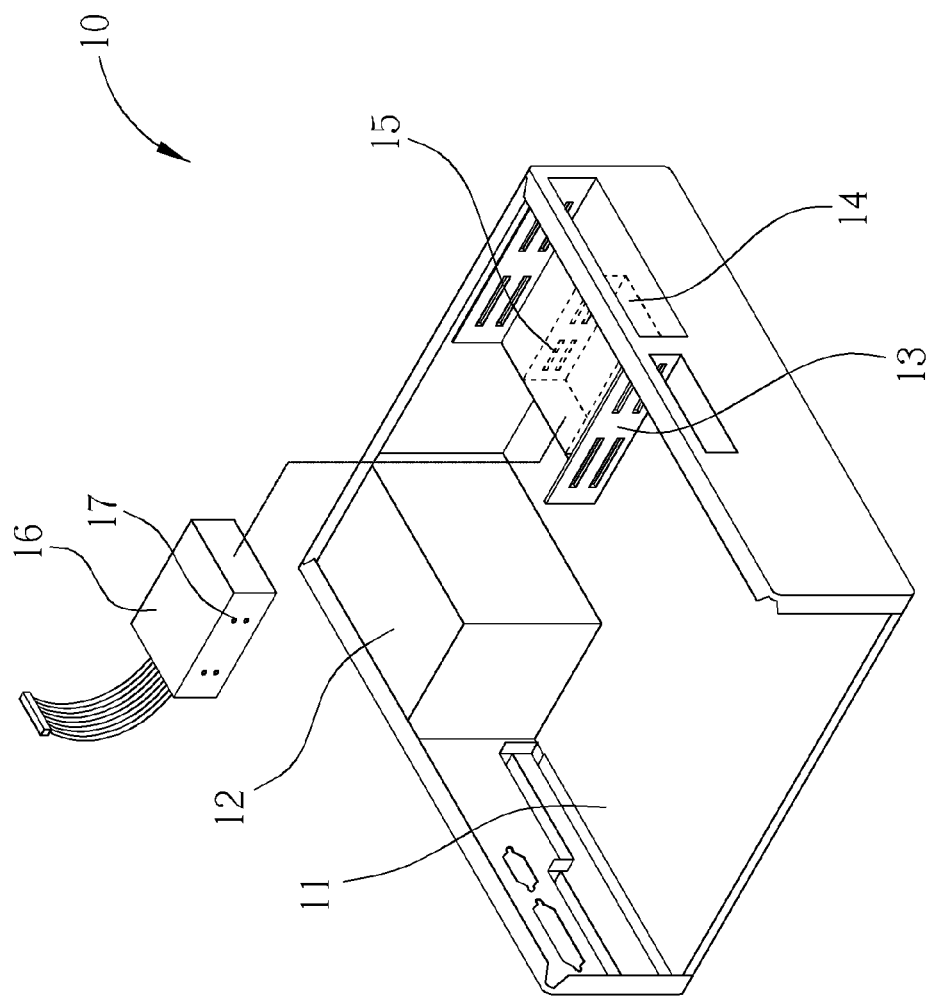
FIG. 1 is a diagram of a computer device in the prior art.
Figure 2:
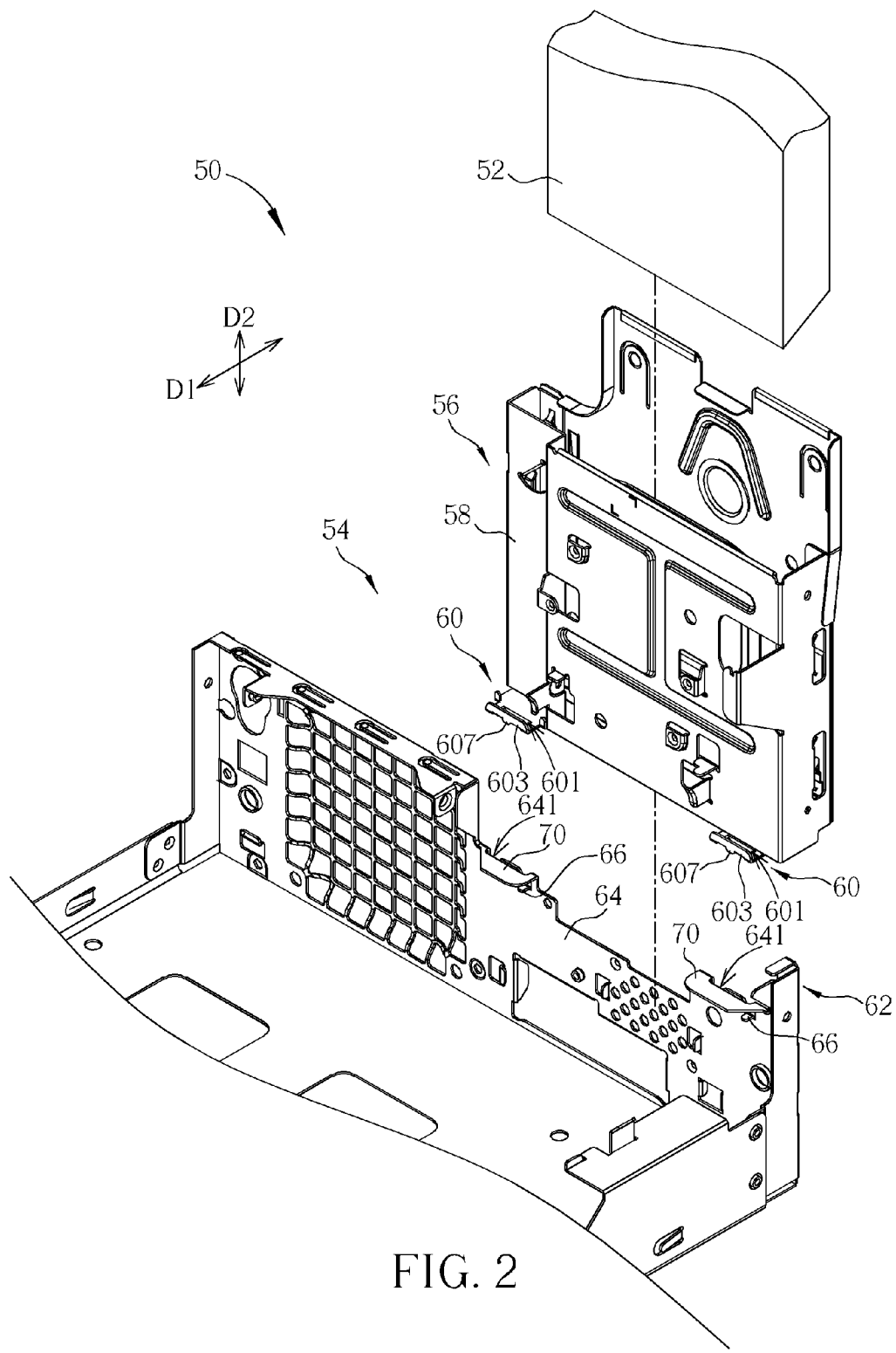
FIG. 2 and FIG. 3 are respectively exploded diagrams of an electronic device in different view angles according to an embodiment of the present invention.
Figure 3:
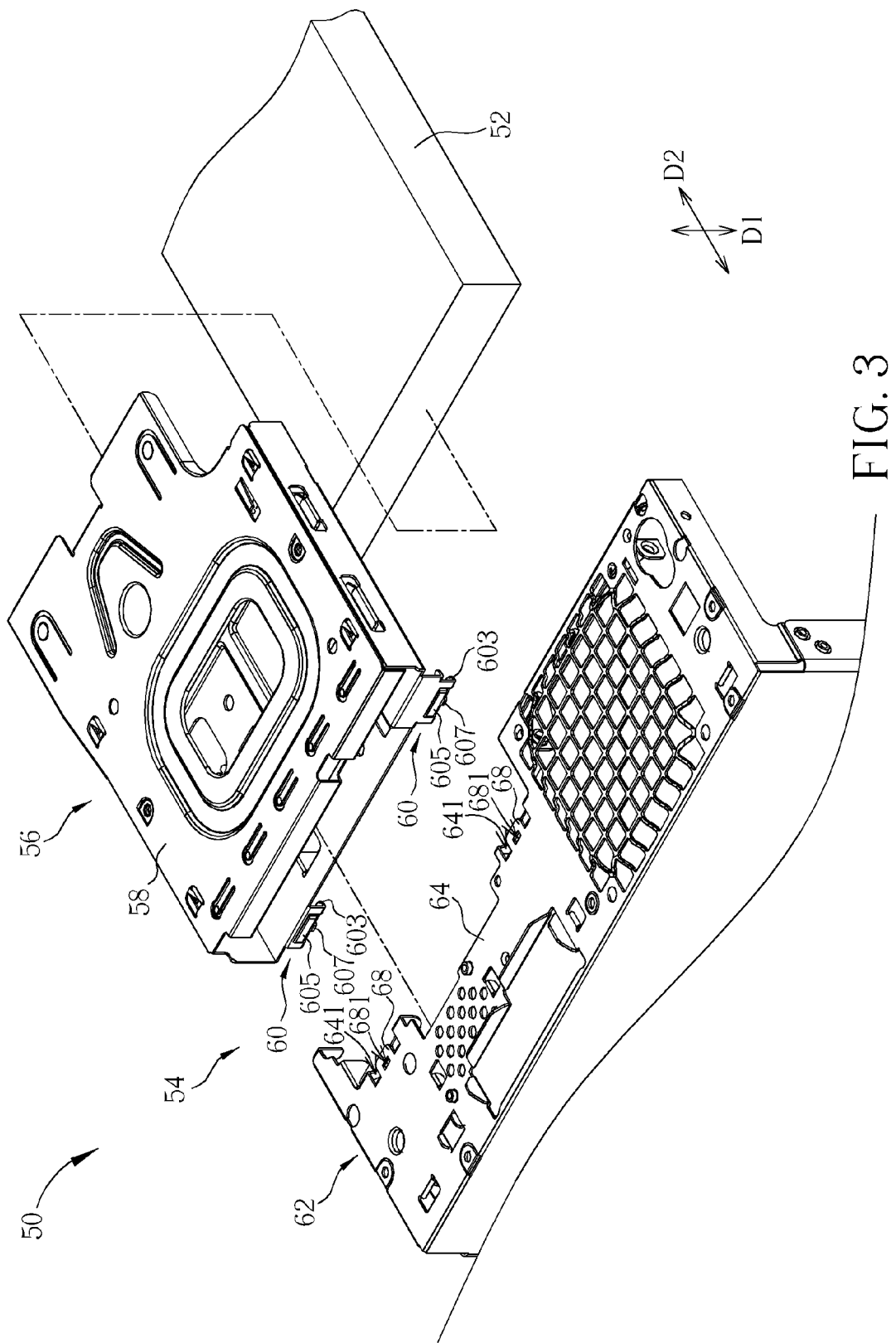
Figure 4:
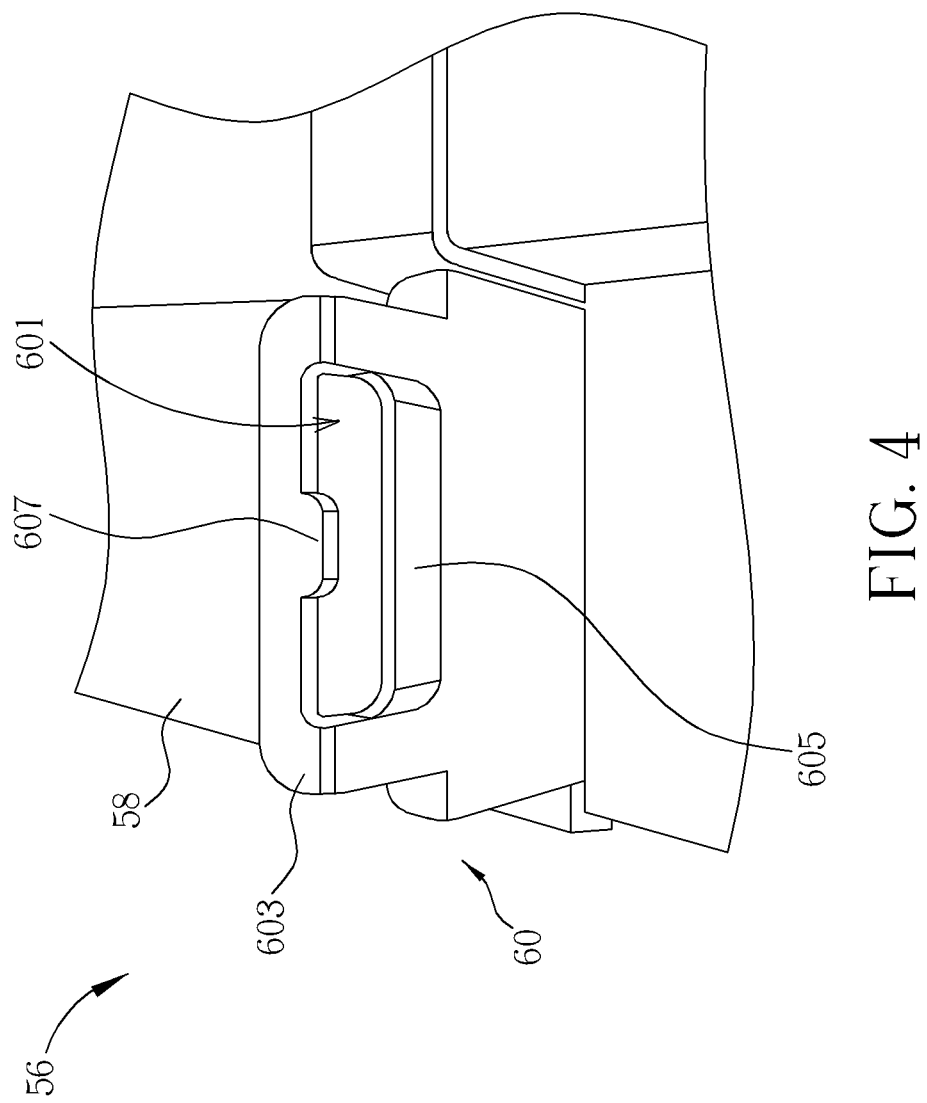
FIG. 4 is a partial enlarged diagram of a frame according to the embodiment of the present invention.

Please refer to FIG. 2 and FIG. 3. FIG. 2 and FIG. 3 are respectively exploded diagrams of an electronic device 50 indifferent view angles according to an embodiment of the present invention. The electronic device 50 can be a computer device, such as a desktop computer and etc. The electronic device 50 includes a detachable module 52 which can be a storage module, such as a hard disk drive or an optical disk drive and etc. The electronic device 50 further includes a fixing mechanism 54 for fixing the detachable module 52. The fixing mechanism 54 includes a frame 56 for covering the detachable module 52, so as to fix and protect the detachable module 52. The frame 56 includes a frame body 58 and at least one pivoting portion 60 connected to the frame body 58, wherein the pivoting portion 60 and the frame body 58 can be integrally formed. In this embodiment, the frame 56 includes two pivoting portions 60 connected to two sides of the frame body 58, respectively. The position and amount of the pivoting portion 60 of the frame 56 are not limited to those mentioned in this embodiment, and it depends on practical demands. Please refer to FIG. 4. FIG. 4 is a partial enlarged diagram of the frame 56 according to the embodiment of the present invention. The pivoting portion 60 includes a pivoting hole 601, a bending structure 603, a protruding structure 605 and a constraining component 607. The bending structure 603, the protruding structure 605 and the constraining component 607 are formed on a side of the pivoting hole 601, and the bending structure 603, the protruding structure 605 and the constraining component 607 can be integrally formed. For example, the bending structure 603 and the protruding structure 605 can be made by stamping.

Figure 5:
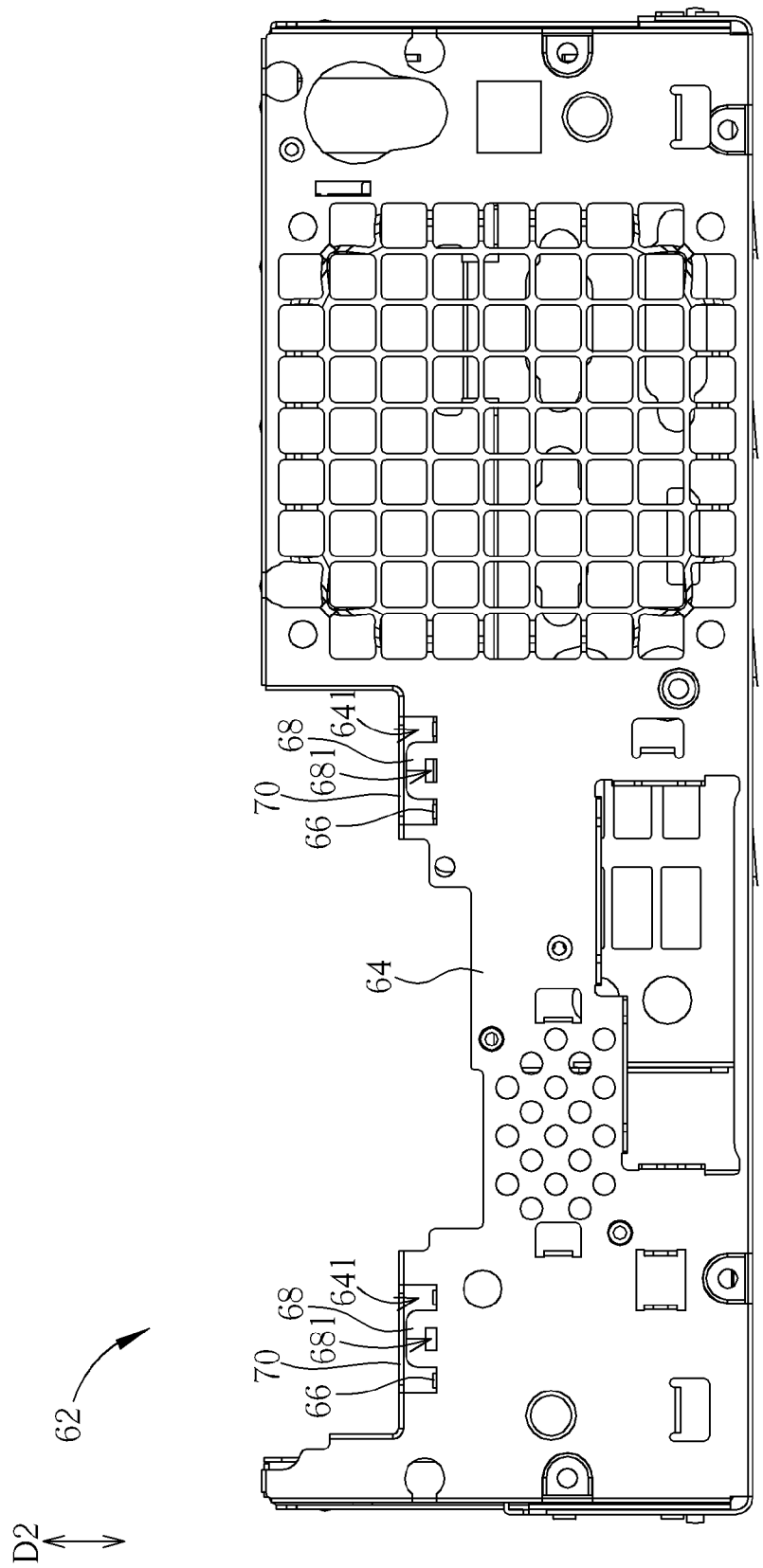
FIG. 5 is a lateral diagram of a casing according to the embodiment of the present invention.

Furthermore, the electronic device 50 further includes a casing 62 for containing internal components of the electronic device 50. Please refer to FIG. 2, FIG. 3 and FIG. 5. FIG. 5 is a lateral diagram of the casing 62 according to the embodiment of the present invention. The casing 62 includes a lateral plate 64 whereon at least one slot 641 is formed. The casing 62 further includes a shaft portion 66 extended from the lateral plate 64 in a first direction D1 and disposed on a side of the slot 641. The casing 62 further includes an engaging portion 68 extended from the lateral plate in a second direction D2 and disposed on another side of the slot 641 for inserting into the pivoting hole 601 of the pivoting portion 60 so that the pivoting portion 60 is capable of pivoting from a first position to a second position relative to the shaft portion 66 as abutting against the shaft portion 66. A positioning hole 681 is formed on the engaging portion 68. The aforesaid first direction D1 can be substantially perpendicular to the second direction D2. The first direction D1 can be substantially perpendicular to the lateral plate 64, and the second direction D2 can be substantially parallel to the lateral plate 64. Furthermore, the casing 62 can further include at least one stopper 70 connected to the lateral plate 64. The stopper 70 can extend from the lateral plate 64 in the first direction D1. In other words, the stopper 70 is parallel to the shaft portion 66. In this embodiment, the casing 62 includes the two slots 641, the two shaft portions 66, the two engaging portions 68 and the two stoppers 70 for combining with the two shaft portions 66 of the frame 56. The positions and the amounts of the slot 641, the shaft portion 66, the engaging portion 68 and the stopper 70 of the casing 62 can correspond to those of the pivoting portion 60 of the frame 56, and it depends on practical demands. Furthermore, the lateral plate 64, the shaft portion 66, the engaging portion 68 and the stopper 70 can be integrally formed, and the shaft portion 66 and the stopper 70 can be made by stamping.

Figure 6:
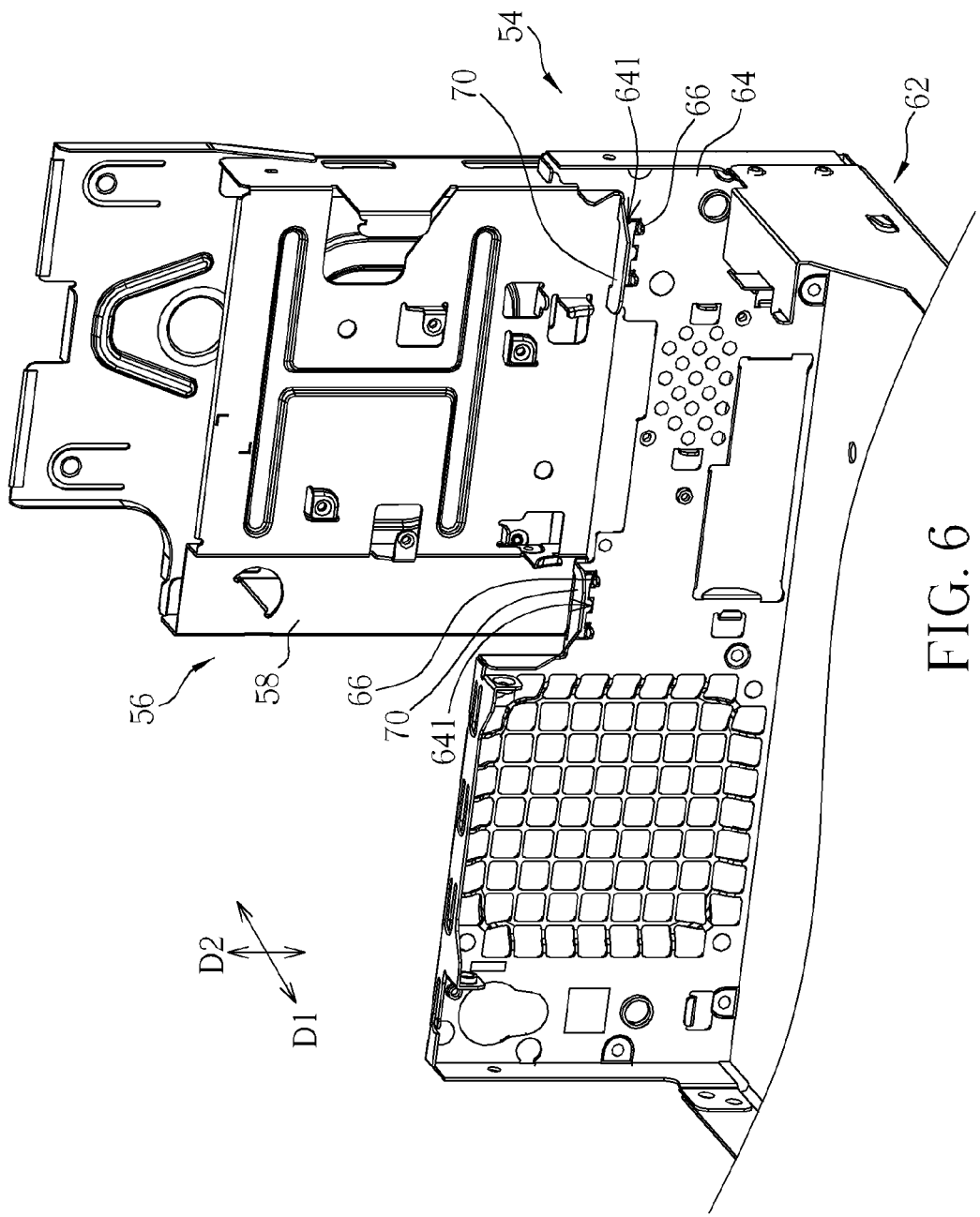
FIG. 6 to FIG. 10 are respectively assembly diagrams of the fixing mechanism in different positions and view angles according to the embodiment of the present invention.
Figure 7:
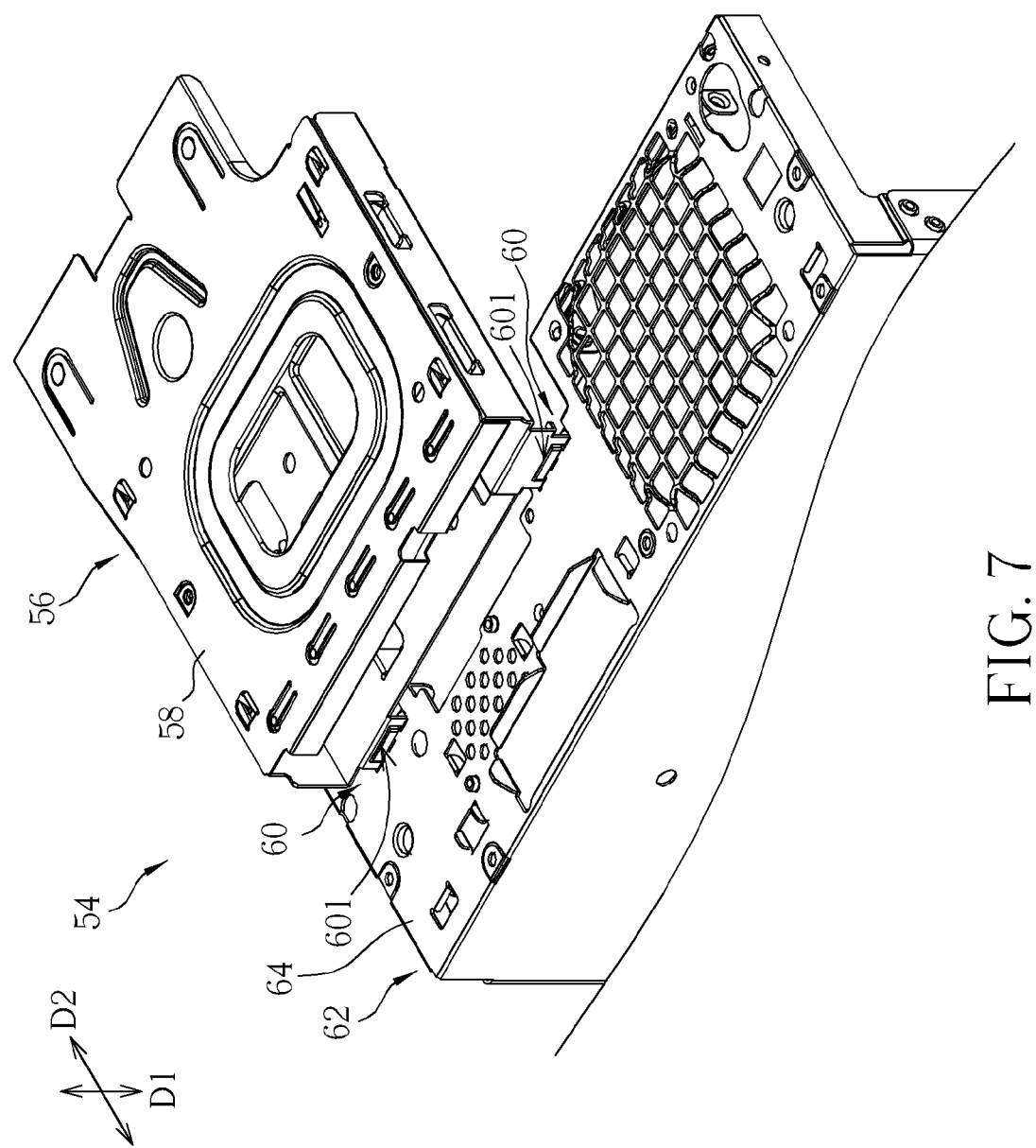
Figure 8:
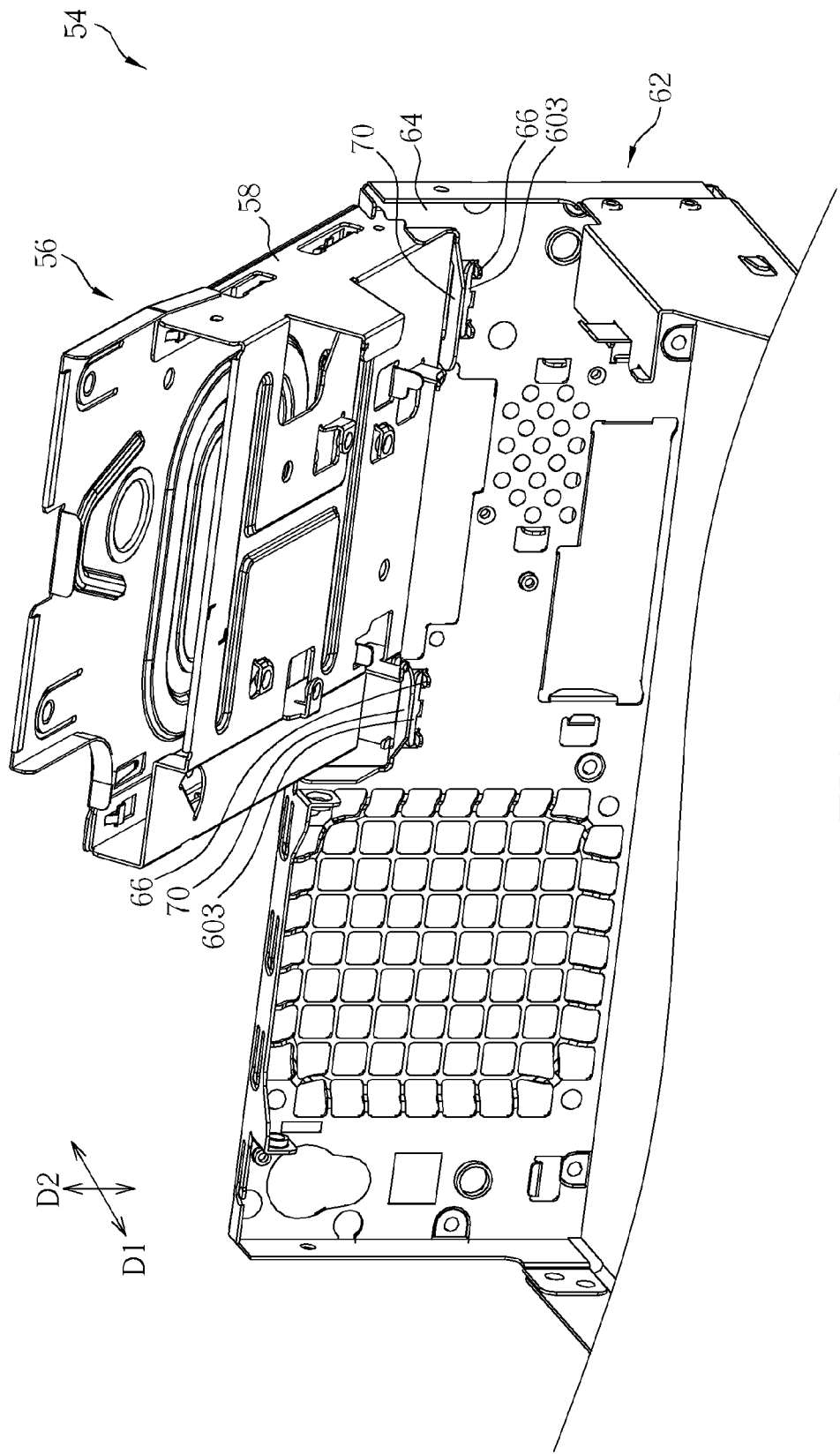
Figure 9:
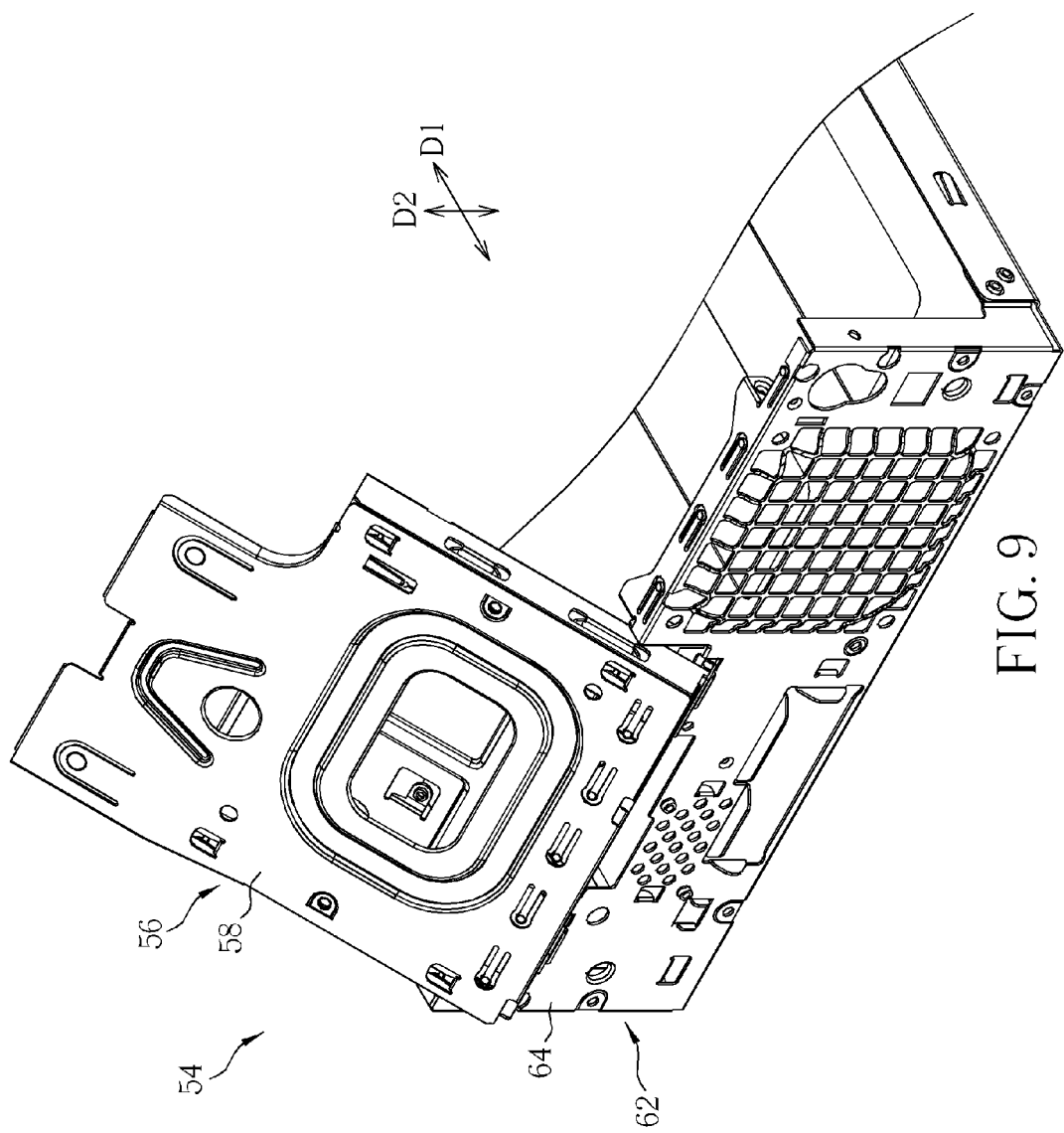

Please refer to FIG. 6 to FIG. 10. FIG. 6 to FIG. 10 are respectively assembly diagrams of the fixing mechanism 54 indifferent positions and view angles according to the embodiment of the present invention. In order to show motions of the fixing mechanism 54, the detachable module 52 is omitted herein. As shown in FIG. 6 and FIG. 7, when assembling the detachable module 52, the frame 56 can be installed on the casing 62 in the second direction D2 first. In other words, the pivoting hole 601 of the pivoting portion 60 on the frame 56 is aligned with the engaging portion 68 on the casing 62, and the engaging portion 68 is inserted into the pivoting hole 601 on the pivoting portion 60, so that the pivoting portion 60 can abut against the shaft portion 66 inside the slot 641 so as to pivot relative to the shaft portion 66. At the same time, the pivoting portion 60 is located at the first position relative to the shaft portion 66, and the frame body 58 of the frame 56 is substantially parallel to the lateral plate 64 of the casing 62. Then, as shown in FIG. 8 and FIG. 9, the pivoting portion 60 is abutted against the shaft portion 66, and the frame 56 is pivoted inward into the casing 62. Accordingly, the frame 56 is installed inside the casing 62. It should be noticed that since the fixing mechanism 54 can include two sets of the pivoting portions 60 and the shaft portions 66 and one of the shaft portions 66 can include two rotary components (the position and the amount of the rotary components not limited to those mentioned in this embodiment), the pivoting portion 60 can be stably pivoted relative to the shaft portion 66 around a single rotary axis, and the rotary axis formed by the shaft portion 66 does not shift. Furthermore, the pivoting portion 60 can selectively include the protruding structure 605 formed thereon, so as to prevent rotary interference as the pivoting portion 66 pivots.

Figure 10:
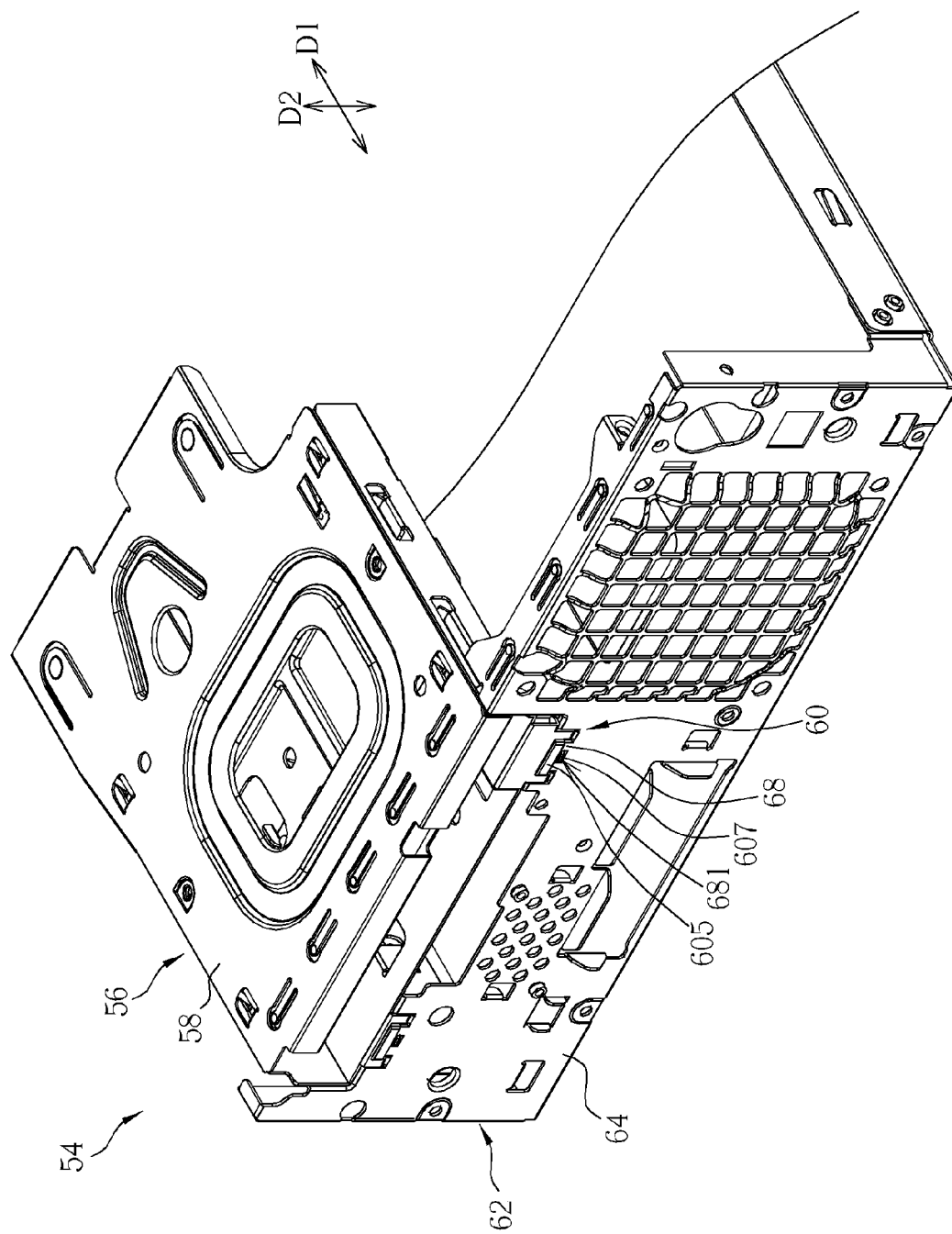

When the pivoting portion 60 pivots relative to the shaft portion 66 from the first position to the second position which differs from the first position by 90 degrees, as shown in FIG. 10, the frame body 58 of the frame 56 can be substantially perpendicular to the lateral plate 64 of the casing 62. In such a manner, the frame 56 can be completely installed inside the casing 62. At the same time, the bending structure 603 on the pivoting portion 60 can abut against the shaft portion 66, and the stopper 70 of the casing 62 can stop the frame body 58 of the frame 56, so as to constrain a pivoting angle between the pivoting portion 60 and the shaft portion 66. Furthermore, in order to prevent the frame 56 from separating from the casing 62 after being installed inside the casing 62, the constraining component 607 on the pivoting portion 60 can be inserted into the positioning hole 681 of the engaging portion 68 as the pivoting portion 60 pivots to the second position. In such a manner, the detachable module 52 can be stably fixed inside the casing 62. As for disassembly of the frame 56 from the casing 62, it is reverse to above-mentioned motions of the assembly. So, it is omitted herein for simplicity.

Compared with the prior art, the present invention provides a fixing mechanism by utilizing a rotary assembly for fixing a detachable module and a related electronic device for improving assembly and disassembly of the detachable module installed inside a computer device. Since the present invention utilizes the frame for covering the detachable module as well as cooperating with the casing so as to rapidly assemble and disassemble the detachable module by rotating, no additional components for assembly is needed, cost decreases effectively, and complexity of assembly and labor hours are greatly reduced. As a result, convenience of assembly and disassembly of the detachable module is effectively enhanced.

Those skilled in the art will readily observe that numerous modifications and alterations of the device and method may be made while retaining the teachings of the invention.

What is claimed is:

1. A fixing mechanism for fixing a detachable module, comprising:
   a frame for covering the detachable module, comprising:
      a frame body; and
      a pivoting portion connected to the frame body, a pivoting hole being formed on the pivoting portion; and
   a casing, comprising:
      a lateral plate whereon a slot is formed;
      an abutting portion extended from the lateral plate in a first direction and disposed on a side of the slot; and
      an engaging portion extended from the lateral plate in a second direction substantially perpendicular to the first direction and disposed on another side of the slot, when the engaging portion is inserted into the pivoting hole of the pivoting portion, the pivoting portion being capable of pivoting from a first position to a second position as abutting against the abutting portion, wherein the frame body of the frame is substantially parallel to the lateral plate of the casing as the pivoting portion is located at the first position, and the frame body of the frame is substantially perpendicular to the lateral plate of the casing as the pivoting portion is located at the second position.

2. The fixing mechanism of claim 1, wherein the pivoting portion further comprises a bending structure formed on a side of the pivoting hole, and the bending structure abuts against the abutting portion as the pivoting portion pivots to the second position.

3. The fixing mechanism of claim 1, wherein the pivoting portion further comprises a protruding structure formed on a side of the pivoting hole, and the protruding structure prevents rotary interference as the pivoting portion pivots relative to the abutting portion.

4. The fixing mechanism of claim 1, wherein the pivoting portion further comprises a constraining component formed on a side of the pivoting hole, a positioning hole is formed on the engaging portion, and the constraining component inserts into the positioning hole for preventing the frame from separating from the casing as the pivoting portion rotates to the second position.

5. The fixing mechanism of claim 1, wherein the casing further comprises a stopper connected to the lateral plate and for stopping the frame body as the pivoting portion rotates to the second position.

6. The fixing mechanism of claim 1, wherein the first direction is substantially perpendicular to the second direction.

7. The fixing mechanism of claim 6, wherein the first direction is substantially perpendicular to the lateral plate, and the second direction is substantially parallel to the lateral plate.

8. An electronic device, comprising:
   a detachable module; and
   a fixing mechanism for fixing the detachable module, comprising:
      a frame for covering the detachable module, comprising:
         a frame body; and
         a pivoting portion connected to the frame body, a pivoting hole being formed on the pivoting portion; and
      a casing, comprising:
         a lateral plate whereon a slot is formed;
         an abutting portion extended from the lateral plate in a first direction and disposed on a side of the slot; and
         an engaging portion extended from the lateral plate in a second direction substantially perpendicular to the first direction and disposed on another side of the slot, when the engaging portion is inserted into the pivoting hole of the pivoting portion, the pivoting portion being capable of pivoting from a first position to a second position as abutting against the abutting portion, wherein the frame body of the frame is substantially parallel to the lateral plate of the casing as the pivoting portion is located at the first position, and the frame body of the frame is substantially perpendicular to the lateral plate of the casing as the pivoting portion is located at the second position.

9. The electronic device of claim 8, wherein the pivoting portion further comprises a bending structure formed on a side of the pivoting hole, and the bending structure abuts against the abutting portion as the pivoting portion pivots to the second position.

10. The electronic device of claim 8, wherein the pivoting portion further comprises a protruding structure formed on a side of the pivoting hole, and the protruding structure prevents rotary interference as the pivoting portion pivots relative to the abutting portion.

11. The electronic device of claim 8, wherein the pivoting portion further comprises a constraining component formed on a side of the pivoting hole, a positioning hole is formed on the engaging portion, and the constraining component inserts into the positioning hole for preventing the frame from separating from the casing as the pivoting portion rotates to the second position.

12. The electronic device of claim 8, wherein the casing further comprises a stopper connected to the lateral plate and for stopping the frame body as the pivoting portion rotates to the second position.

13. The electronic device of claim 8, wherein the first direction is substantially perpendicular to the second direction.

14. The electronic device of claim 8, wherein the first direction is substantially perpendicular to the lateral plate, and the second direction is substantially parallel to the lateral plate.

15. The electronic device of claim 8, wherein the detachable module is a hard disk drive or an optical disk drive.

* * * * *